(12) United States Patent
Everhart et al.

(10) Patent No.: US 10,702,925 B1
(45) Date of Patent: Jul. 7, 2020

(54) NANOCELLULOSIC METAL MATRIX COMPOSITE

(71) Applicant: HONEYWELL FEDERAL MANUFACTURING & TECHNOLOGIES, LLC, Kansas City, MO (US)

(72) Inventors: Wesley Everhart, Kansas City, MO (US); Benjamin Brown, Kansas City, MO (US); Dan Bowen, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 905 days.

(21) Appl. No.: 15/256,069

(22) Filed: Sep. 2, 2016

(51) Int. Cl.
B22F 7/00 (2006.01)
B22F 3/10 (2006.01)
B22F 9/04 (2006.01)
B33Y 10/00 (2015.01)
B33Y 70/00 (2020.01)
B33Y 80/00 (2015.01)
(Continued)

(52) U.S. Cl.
CPC ............ B22F 7/008 (2013.01); B22D 21/00 (2013.01); B22D 25/06 (2013.01); B22F 3/10 (2013.01); B22F 9/04 (2013.01); B33Y 10/00 (2014.12); B33Y 70/00 (2014.12); B33Y 80/00 (2014.12); B22F 2301/052 (2013.01); B22F 2301/058 (2013.01); B22F 2301/15 (2013.01); B22F 2301/205 (2013.01); B22F 2302/45 (2013.01); B22F 2998/10 (2013.01)

(58) Field of Classification Search
CPC .... B22F 7/008; B22F 3/10; B22F 9/04; B22F 2301/052; B22F 2301/058; B22F 2301/15; B22F 2301/205; B22F 2302/45; B22F 2998/10; B33Y 10/00; B33Y 70/00; B33Y 80/00; B22D 21/00; B22D 25/06
See application file for complete search history.

(56) References Cited

U.S. PATENT DOCUMENTS

2004/0177943 A1* 9/2004 Rogowski ................. B22F 3/26
164/97
2005/0079086 A1* 4/2005 Farr ....................... B22F 1/0059
419/36
(Continued)

FOREIGN PATENT DOCUMENTS

CN 101818280 B * 3/2014
WO 2009089268 7/2009
(Continued)

OTHER PUBLICATIONS

CN101818280 espacenet translation (Year: 2014).*

Primary Examiner — Anthony J Zimmer
Assistant Examiner — Ricardo D Morales
(74) Attorney, Agent, or Firm — Hovey Williams LLP

(57) ABSTRACT

A composite material comprising a metal matrix and nanocellulose supplement. The metal matrix is formed of a metal base material and may be monolithic throughout the composite material. The nanocellulose supplement improves a material property of the metal matrix and is formed of a nanocellulose supplement material dispersed in the metal base material. Importantly, the nanocellulose supplement material does not become damaged when the composite material is formed.

7 Claims, 1 Drawing Sheet

(51) Int. Cl.
 *B22D 21/00* (2006.01)
 *B22D 25/06* (2006.01)

(56) References Cited

U.S. PATENT DOCUMENTS

| | | |
|---|---|---|
| 2011/0215500 A1 | 9/2011 | Farrell |
| 2013/0065026 A1 | 3/2013 | Walther et al. |
| 2013/0130049 A1* | 5/2013 | Moilanen ............... C08L 63/00 428/532 |
| 2015/0044415 A1 | 2/2015 | Read et al. |

FOREIGN PATENT DOCUMENTS

| | | |
|---|---|---|
| WO | 2015034628 | 3/2015 |
| WO | 2015077262 | 5/2015 |

\* cited by examiner

NANOCELLULOSIC METAL MATRIX COMPOSITE

STATEMENT REGARDING FEDERALLY-SPONSORED RESEARCH OR DEVELOPMENT

This invention was made with government support under Contract No.: DE-NA0002839 awarded by the Department of Energy. The government has certain rights in the invention.

BACKGROUND

Composite materials are often used for combining mechanical, electrical, and/or chemical properties of two or more materials. For example, polymeric composites include reinforcing fillers to strengthen elastic polymers. Graphene and carbon nanotubes are often used as reinforcement materials for polymers, but do not disperse easily and often one or more of the individual constituents of the composite become damaged upon dispersion.

SUMMARY

Embodiments of the invention solve the above-mentioned problems and provide a distinct advance in the art of composite materials. More particularly, the invention provides a composite material having a supplement material that is easily dispersed and does not become damaged during dispersion. Improved dispersion leads to improved composite material properties.

An embodiment of the invention is a composite material comprising a metal matrix and nanocellulose supplement. The metal matrix is formed of a metal base material and may be continuous throughout the composite material. The nanocellulose supplement improves a material property of the metal matrix and is formed of a nanocellulose supplement material dispersed in the metal base material. Importantly, the particles of nanocellulose supplement material disperse easily into the metal base material.

Another embodiment of the invention is a method of forming a composite material comprising dispersing a nanocellulose supplement material into a metal base material. The nanocellulose supplement material and the metal base material are then consolidated such that the metal base material fuses together to form a metal matrix. The nanocellulose supplement material forms a nanocellulose supplement distributed throughout the fused metal matrix for improving a material property of the metal matrix.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Figure 1:
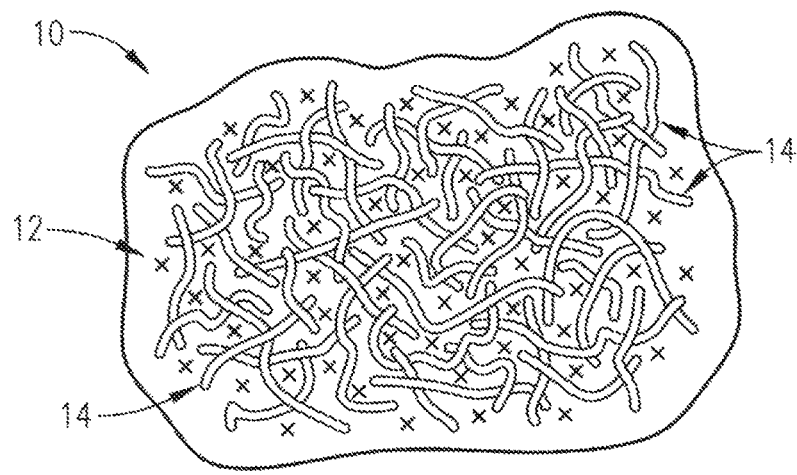
FIG. 1 is a microscopic view of a composite material formed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
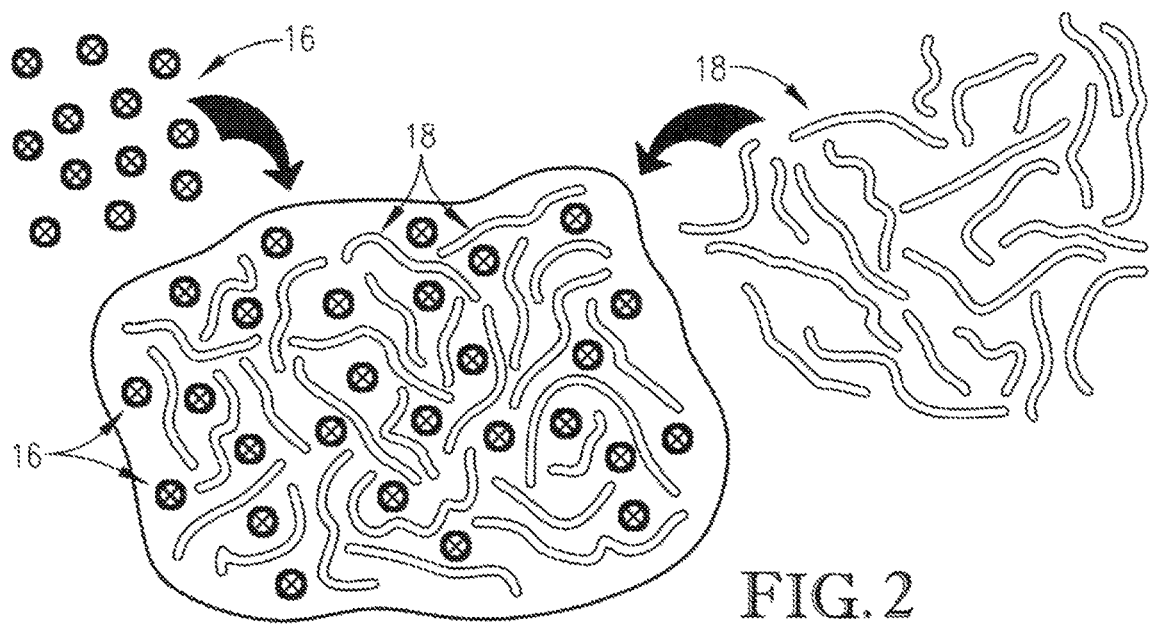
FIG. 2 is a microscopic view of a mixture of composite materials for forming the composite material of FIG. 1.

Turning now to FIGS. 1 and 2, a composite material 10 formed in accordance with an embodiment of the invention is illustrated. The composite material 10 broadly comprises a metal matrix 12 and a nanocellulose supplement 14.

The metal matrix 12 forms a base structure and may be a monolithic material such that the metal matrix 12 is continuous throughout the composite material 10. The metal matrix 12 may be formed of aluminum, magnesium, titanium, or other structural metals, or cobalt, cobalt-nickel alloys, steel and ferrous alloys, or other metals for high-temperature applications. The metal matrix 12 may be formed from a metal base material 16 such as a powder or feedstock as described in more detail below.

The nanocellulose supplement 14 improves properties of the composite material 10 and may be microscopic nanocellulose particles dispersed throughout the metal matrix 12. The nanocellulose supplement 14 may be substantially mixed with particles of the metal matrix 12 such that the composite material 10 is a homogenous composite. The nanocellulose supplement 14 may be any form of nanostructured cellulose. This may be either cellulose nanofibers (CNF), also called microfibrillated cellulose (MFC), nanocrystalline cellulose (NCC), also called crystalline nanocellulose, and bacterial nanocellulose, which refers to nanostructured cellulose produced by bacteria, among others, not to limit other potential forms or sources of nanocellulose. The nanocellulose supplement 14 may increase strength, improve conductivity, or change porosity of the metal matrix 12 or alter other properties of the composite material 10. The nanocellulose supplement 14 may be formed from a nanocellulose supplement material 18 as described in more detail below.

Figure 3:
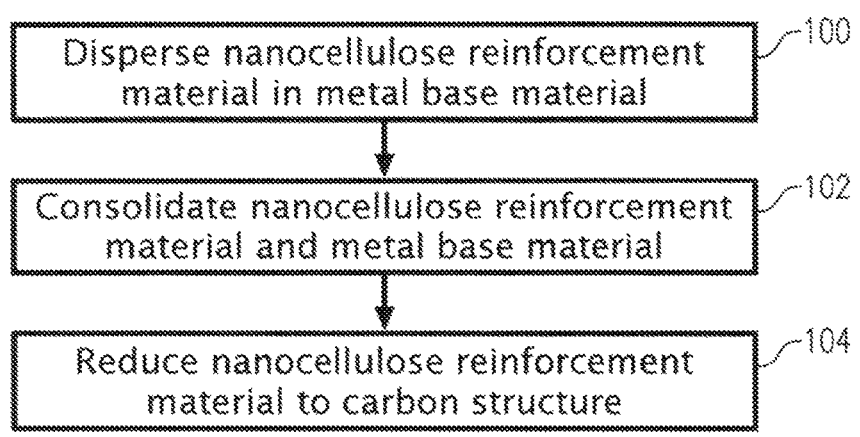
FIG. 3 is a flow diagram of steps in a method of forming a composite material in accordance with another embodiment of the invention.

Forming the composite material 10 via consolidation such as additive manufacturing, casting, and sintering will now be described in more detail. First, a metal base material 16 (e.g., microscopic metal matrix particles) such as metal powder and a nanocellulose supplement material 18 (e.g., microscopic nanocellulose particles) may be blended together (FIG. 2) such that the nanocellulose supplement material is dispersed in the metal base material 16, as shown in block 100 of FIG. 3. This may be performed via pre-mixing, simultaneous material dispensing, or any other suitable dispersion.

The metal base material 16 and the nanocellulose supplement material 18 may then be consolidated such as via high temperature consolidation (e.g., compaction, degassing, and/or thermo-mechanical treatment) such that the metal base material 16 fuses or otherwise bonds together with the nanocellulose supplement material 18 being dispersed throughout the metal matrix 12, as shown in block 102. The nanocellulose supplement material 18 may be heated to a predetermined temperature and/or pressure for a predetermined amount of time for effecting proper fusing of the metal base material 16 and dispersion of the nanocellulose supplement material 18. The consolidation may also be performed in a vacuum or under pressure.

The nanocellulose supplement material 18 may be subjected to partial burnout or complete burnout such that at least some of the organic structure of the nanocellulose supplement material 18 is reduced to carbon, as shown in block 104. This results in undamaged carbon reinforcing the metal matrix 12.

The composite material 10 may also be formed via electroplating, electroforming, vapor deposition, and in-situ fabrication. For example, the metal matrix 12 and the nanocellulose supplement 14 may be blended via solid state, semi-solid state, or liquid state processing. The particular nanocellulose supplement material may be selected according to the desired improved property of the composite material 10. The relative percentage of nanocellulose supplement 14 to metal matrix 12 may also be chosen according to the desired properties of the composite material 10. For example, more nanocellulose supplement 14 may be used if additional porosity is desired.

The above-described composite material 10 and method of forming the same provide several advantages over conventional composite materials. For example, the nanocellulose supplement material 18 can be dispersed in the metal base material 16 without damage to the nanocellulose supplement material 18, unlike graphene and carbon nanotubes which become damaged during formation. The nanocellulose supplement material 18 is also more easily dispersed in the metal base material 16 than graphene and carbon nanotubes. The composite material 10 can be formed via additive manufacturing, casting, and sintering, allowing for the composite material 10 to be used in large and small structural, electrical, biochemical, and biomechanical applications. Nanocellulose is also a renewable and readily available resource.

Having thus described various embodiments of the invention, what is claimed as new and desired to be protected by Letters Patent includes the following:

1. A composite material comprising:
a metal matrix formed of a metal base material; and
a nanocellulose supplement distributed throughout the metal matrix and formed of a nanocellulose supplement material dispersed in the metal base material via simultaneous material dispensing, the nanocellulose supplement material and the metal base material being consolidated via high temperature additive manufacturing in a vacuum or under pressure, at least one material property of the metal matrix being altered via the nanocellulose supplement, the nanocellulose supplement material being completely reduced to carbon structure via burnout, the carbon structure being undamaged and reinforcing the metal matrix,
wherein the additive manufacturing is at least one of electroplating, electroforming, vapor deposition, and in-situ fabrication.

2. The composite material of claim 1, wherein a mechanical or thermal property of the composite material is altered via the nanocellulose supplement.

3. The composite material of claim 1, wherein an electrical or chemical property of the composite material is altered via the nanocellulose supplement.

4. The composite material of claim 1, wherein a porosity of the composite material is altered via the nanocellulose supplement.

5. A composite material comprising:
a metal matrix formed of a monolithic metal base material continuous throughout the composite material; and
a nanocellulose supplement distributed throughout the metal matrix such that the composite material is homogenous, the nanocellulose supplement being formed of a nanocellulose supplement material dispersed in the metal base material via simultaneous material dispensing, the nanocellulose supplement material and the metal base material being consolidated via high temperature additive manufacturing in a vacuum or under pressure such that the metal base material fuses together, at least one material property of the metal matrix being altered via the nanocellulose supplement, the nanocellulose supplement material being at least partially reduced to carbon structure via burnout, the carbon structure being undamaged and reinforcing the metal matrix,
wherein the additive manufacturing is at least one of electroplating, electroforming, vapor deposition, and in-situ fabrication,
wherein the nanocellulose supplement alters a mechanical property, a thermal property, an electrical property, a chemical property, and a porosity of the composite material.

6. The composite material of claim 1, wherein the nanocellulose supplement material and the metal base material are consolidated via high temperature additive manufacturing in a vacuum.

7. The composite material of claim 5, wherein the nanocellulose supplement material and the metal base material are consolidated via high temperature additive manufacturing in a vacuum.

* * * * *